(12) United States Patent
Allen et al.

(10) Patent No.: US 6,314,492 B1
(45) Date of Patent: Nov. 6, 2001

(54) SYSTEM AND METHOD FOR SERVER CONTROL OF CLIENT CACHE

(75) Inventors: Michael John Allen; Jonathan Penn Furminger, both of Endicott, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/085,632

(22) Filed: May 27, 1998

(51) Int. Cl.[7] .................................................. G06F 12/00
(52) U.S. Cl. ........................ 711/135; 711/133; 711/134; 709/213; 709/216
(58) Field of Search ..................................... 711/133, 134, 711/135; 709/213, 210, 203, 217, 218

(56) References Cited

U.S. PATENT DOCUMENTS

| | | | |
|---|---|---|---|
| 4,264,953 | * 4/1981 | Douglas et al. | 711/3 |
| 5,045,996 | * 9/1991 | Barth et al. | 711/143 |
| 5,572,643 | 11/1996 | Judson | 395/793 |
| 5,617,540 | 4/1997 | Civanlar et al. | 395/200.11 |
| 5,715,453 | 2/1998 | Stewart | 395/615 |
| 5,778,431 | * 7/1998 | Rahman et al. | 711/135 |
| 5,845,325 | * 12/1998 | Loo et al. | 711/135 |
| 5,953,741 | * 9/1999 | Evoy et al. | 711/132 |
| 5,983,227 | * 11/1999 | Nazem et al. | 707/10 |

FOREIGN PATENT DOCUMENTS

| | | | |
|---|---|---|---|
| 813159 | 12/1997 | (EP) | G06F/17/30 |
| 9-146818 | 6/1997 | (JP) | G06F/12/00 |
| 9-44403 | 2/1997 | (JP) | G06F/12/08 |
| 97/17662 | 11/1996 | (WO) | G06F/17/30 |
| 97/20281 | 11/1996 | (WO) | G06G/3/10 |

OTHER PUBLICATIONS

"Creation of an Update Profile for Internet", IBM Technical Disclosure Bulletin, vol. 40 No. 12 Dec. 1997 P. 13.

* cited by examiner

Primary Examiner—John W. Cabeca
Assistant Examiner—Brian R Peugh
(74) Attorney, Agent, or Firm—Shelley M Beckstrand

(57) ABSTRACT

System and method for controlling the contents of a browser cache. A data stream from a host server to a client browser includes a clear cache tag. Responsive to the clear cache tag, the browser clears its cache. The data stream may also include a start cache tag, and one or more data files which are cached by the client browser. Responsive to the clear cache tag, the browser cache is cleared of data files received in the data stream between the start cache tag and the clear cache tag, or alternatively of all data files in cache associated with a cache identifier received in the start cache and clear cache tags. Either the client local file system or a field in a cache table is used to differentiate between successive start cache tags.

13 Claims, 8 Drawing Sheets

SYSTEM AND METHOD FOR SERVER CONTROL OF CLIENT CACHE

BACKGROUND OF THE INVENTION

1. Technical Field of the Invention

This invention relates to control of a client browser. More specifically, it relates to control of a client browser cache by a server.

2. Background Art

Web confidential server data sites, bank balances, brokerage balances, and so forth, instruct a client to log out and clear the browser cache. Typically, the log out is performed by way of a tag on a web page, and the clearing of the cache is done by way of (for Netscape™) an options network preferences menu option which requires the user to activate a clear cache button on the dialog. This method of clearing cache is difficult for a user to find and easy to forget to do. Thus, while clearing a browser cache responsive to a user command is known in the art, there is a need for a system and method which enables a server, as distinguished from the browser, to control the web page contents, which may contain confidential data, of a browser cache.

It is, therefore, an object of the invention to provide a more reliable system and method for clearing a browser cache.

It is a further object of the invention to provide a system and method for clearing a browser cache which does not rely on user action.

It is a further object of the invention to provide a system and method for clearing a browser cache under control of the server.

It is a further object of the invention to provide an improved client browser responsive to a server tag to clear its cache.

SUMMARY OF THE INVENTION

This invention comprises a system and method for controlling the contents of a browser cache. The browser receives in a data stream from a host server a clear cache tag; and responsive to that clear cache tag, clears the browser cache.

Other features and advantages of this invention will become apparent from the following detailed description of the presently preferred embodiment of the invention, taken in conjunction with the accompanying drawings.

BRIEF DESCRIPTION OF THE DRAWINGS

FIG. 5, are a flow diagram of the method of the preferred embodiment of the invention.

BEST MODE FOR CARRYING OUT THE INVENTION

In accordance with the invention, a server is able to control what is in a browser cache.

In accordance with the invention, responsive to a .you are logged out. web page from a server containing a <clear cache> tag, a client browser clears its cache of data. In accordance with a further aspect of the invention, in response to such a <clear cache> tag, the client browser clears part of its cache, that portion of cache containing data in a data stream between a <start cache> and the <clear cache> tags. This allows, for example, a server to instruct a browser to clear that portion of cache containing confidential data, such as a bank balance. Further, such tags may be stacked, thereby allowing a user to jump to another confidential source and only the data in the new web pages is cleared. As an example, assume a user is on his bank account web page, and decides to sell some stock. The user logs in to his brokerage web site, checks his balance, executes a transaction or not, and then decides to log off. In accordance with this invention, the log off web page for the brokerage includes a <clear cache> tag which causes the browser to clear all of the brokerage web pages. When the user hits the back key on the browser, execution returns to the bank account web page, not the brokerage web page.

Figure 1:
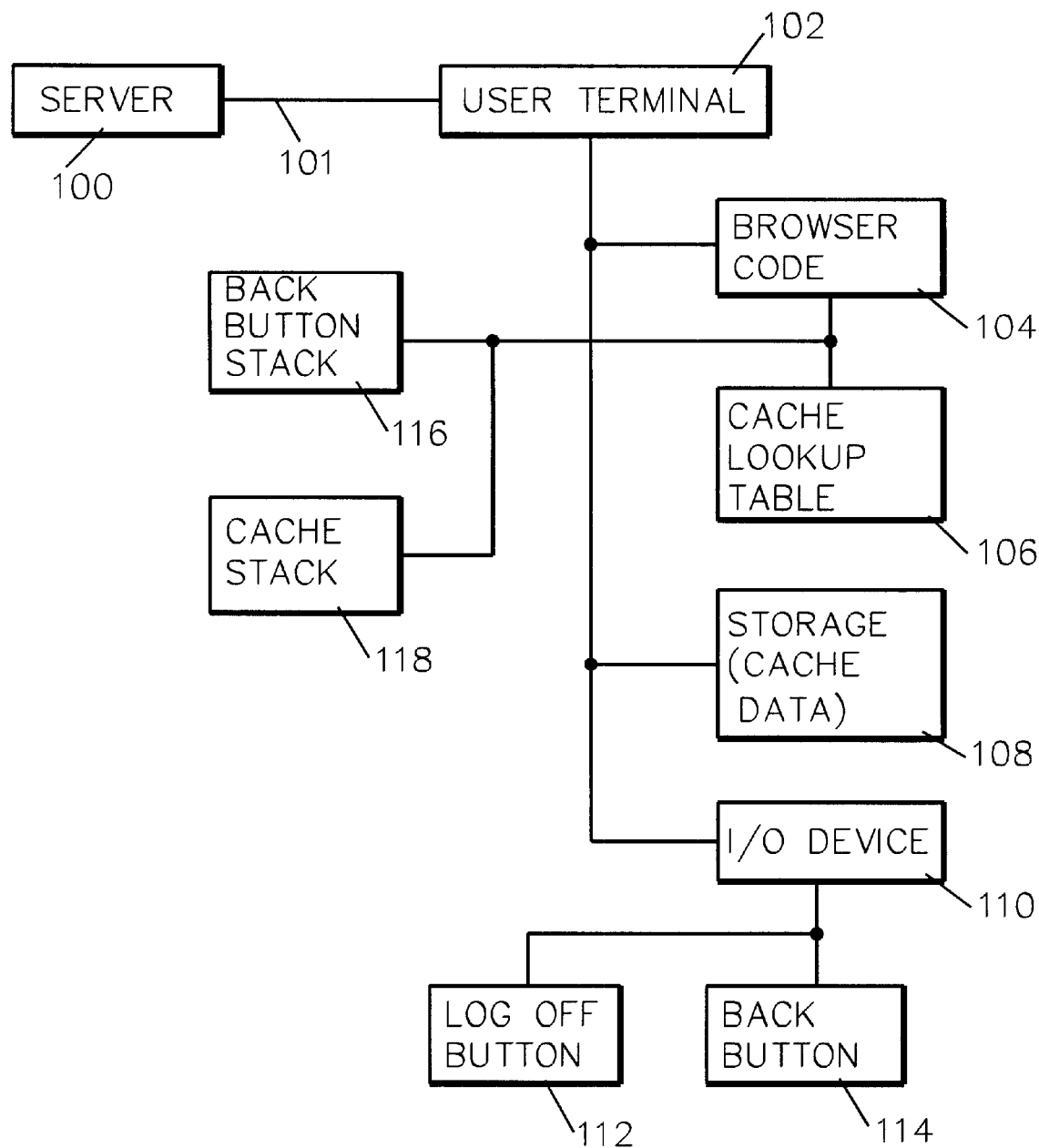
FIG. 1 is a block diagram illustrating the system of the invention.

Referring to FIG. 1, the system of the invention includes a host server 100 and client, or user, terminal 102 interconnected as shown by line 101 over a communication link, such as local area network (LAN) or wide area network (WAN), or some combination of such, capable of communicating a hyper-text markup language (html) data stream 120 (FIG. 2) from server 100 to client 102. Server may be any of a number of programmable computing systems, such as an IBM System/390 computer, IBM AS/400 system, or the like. User terminal may be any of a number of programmable workstations, such as an IBM Personal Computer, IBM AS/400 system, or the like. Communications link 101 includes a port at server 100 for communicating a data stream from a host processor and a port at client 102 for receiving that data stream.

Server 100 may be any prior art host computer system programmed to include tags in data streams to a client for controlling the contents of a browser cache. Client terminal 102 includes browser code 104 with a cache lookup table 106, back button stack 116 and cache stack 118; storage 108, a hard (non-volatile) or volatile read/write storage device such as a magnetic or optical disk or even addressable storage locations in main memory; and a user input/output (I/O) device 110, such as a keyboard, display, and mouse or light pen. I/O device provides through the key board or the display a log off button 112 and a back button 114. Back button stack 116 is a LIFO stack of pointers to URLs in order of execution.

Browser code 104 may be based upon prior art browsers, such as those provided by Netscape or Microsoft, modified in accordance with the present invention to recognize and respond to the new html tags <start cache> and <clear cache>.

In operation, a user at terminal 102 may operate device 110 to request log on to an application at server 100, which may respond with an html or the like data stream including text and, possibly, images or other such non-textual data. The html data stream is parsed by browser code 104, which may request additional text and non-textual data files from server 100, and store the data stream and files as cache data in storage 108 indexed by cache lookup table 106.

Figure 2:
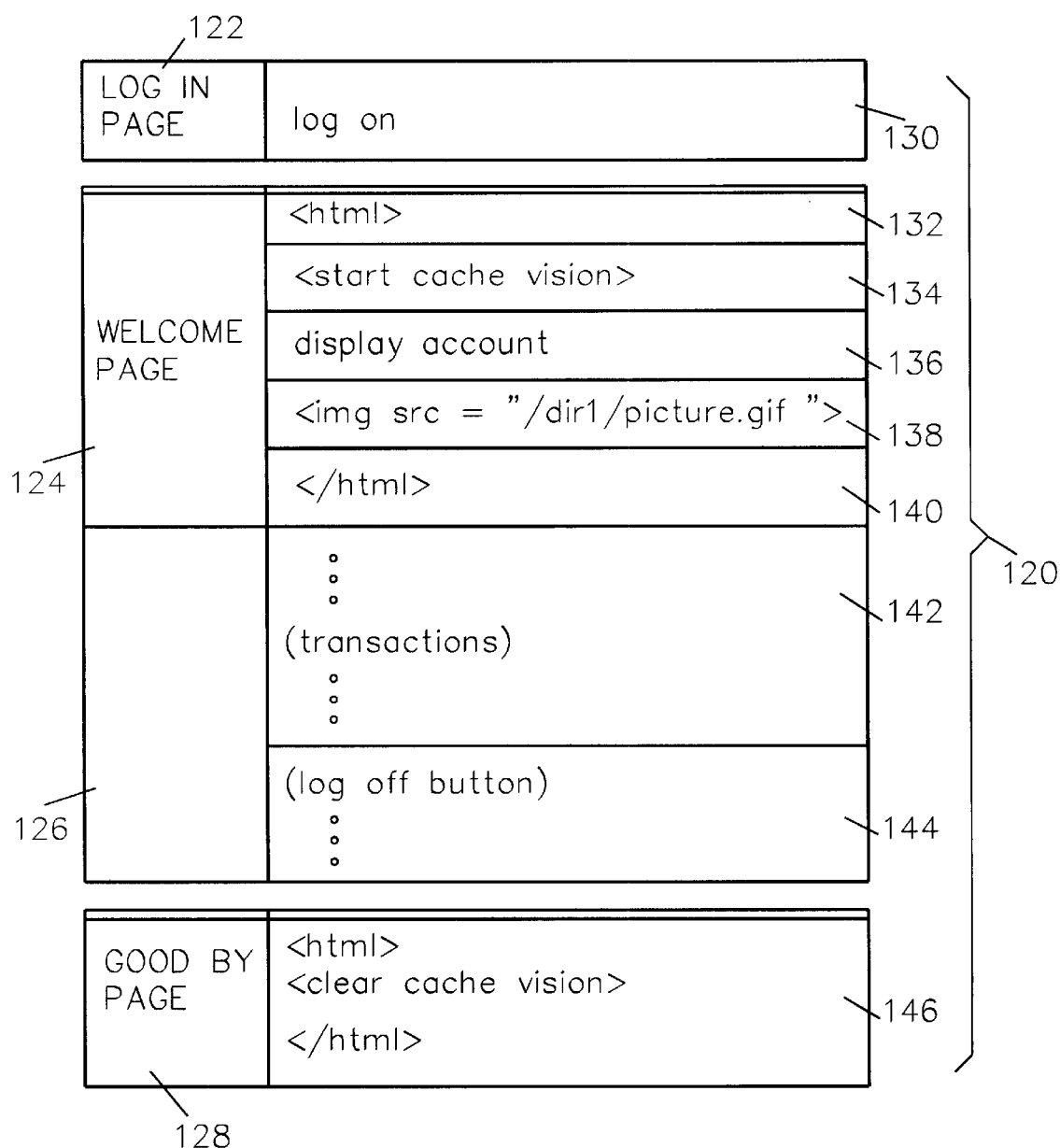
FIG. 2 is a diagrammatic representation of an HTML data stream from a server to a browser in accordance with the invention.

Referring to FIG. 2, an html data stream 120 from server 100 to user terminal 102 includes a log in page 122, a welcome page 124 and a good bye page 128. Other data 126 includes the exchange of transaction information 142 which continues until a log off button 112 is activated and sent 144 from client 102 to server 100. A typical log in page 122 includes a log on page 130 containing two entry fields displayed at device 110 for user entry of an identifier and a password which, upon being received and determined to be valid by server 100, cause communication of the welcome page 124 from server 100 to terminal 102. In a typical example, in accordance with the present invention, welcome page 124 may include <html> 132, <start cache vision> 134, display account 136, <img src=./dir1/picture.gif.> 138, and </html> 140. Goodby page 128 may, in this example, include a data stream 146 including <html>, <clear cache vision> and </html>.

<start cache vision> 134 includes the .start cache. tag and an identifier of the server. This may be an organization name, such as .vision..

<clear cache vision> 146 includes the .clear cache. tag and the server identifier .vision., and is interpreted by browser 104 as an instruction to clear its cache 108 of everything in the data stream 120 between <start cache vision> 134 and <clear cache vision> 146.

<img src=./dir1/picture.gif.> 138 includes the image source tag and the server 100 directory ./dir. containing the data file ./picture.gif., in this case a file from server 100 containing the panel to be displayed at device 110, and which will be stored in storage cache 108. Storage 108 includes a flat file of image and html pages that are stored for the life of a cache.

Figure 3:
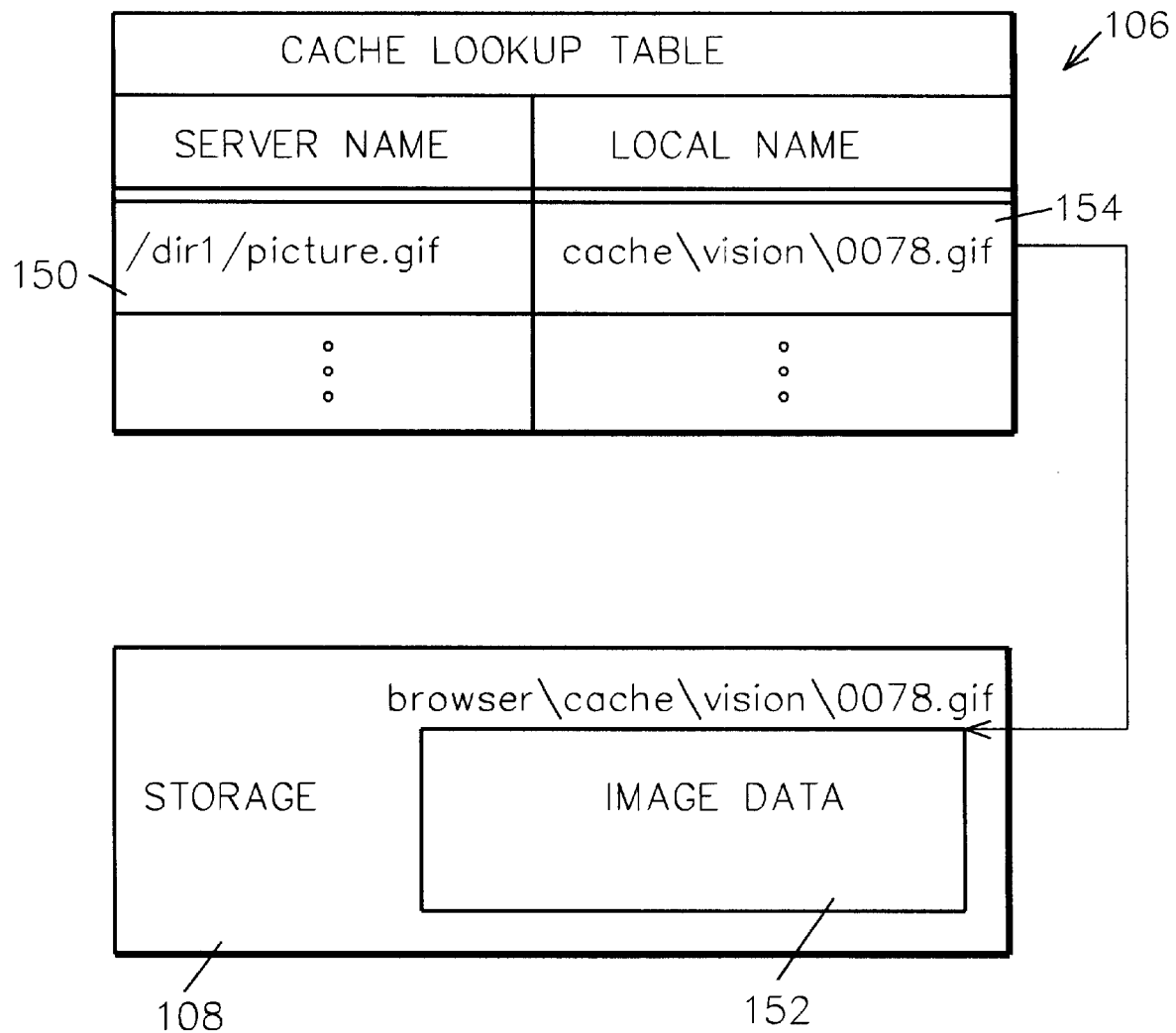
FIG. 3 is a diagrammatic representation of the cache lookup table and storage of FIG. 1 in accordance with a first embodiment of the invention.
Figure 4:
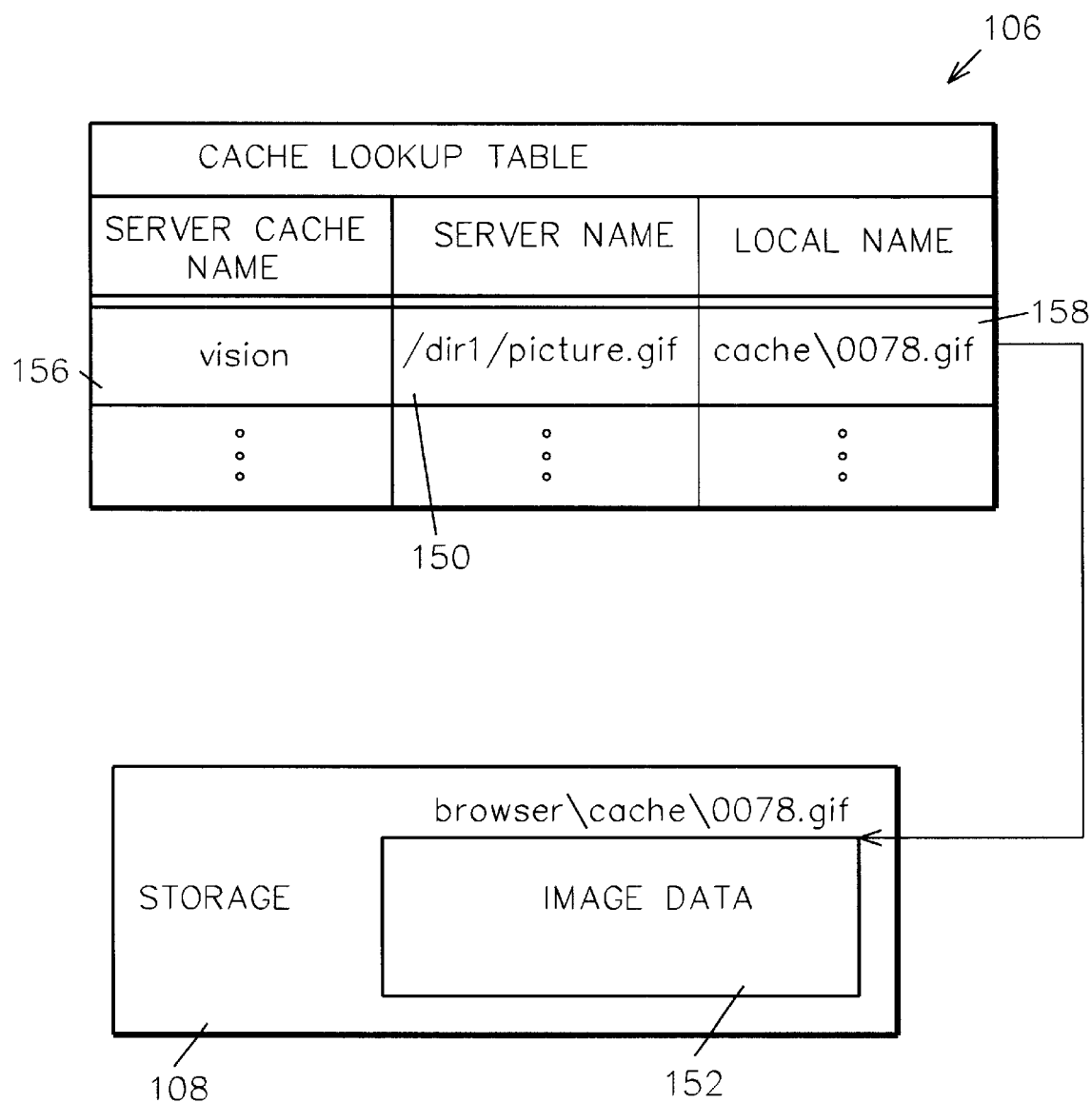
FIG. 4 is a diagrammatic representation of the cache lookup table and storage of FIG. 1 in accordance with a second embodiment of the invention.
Figure 5A:
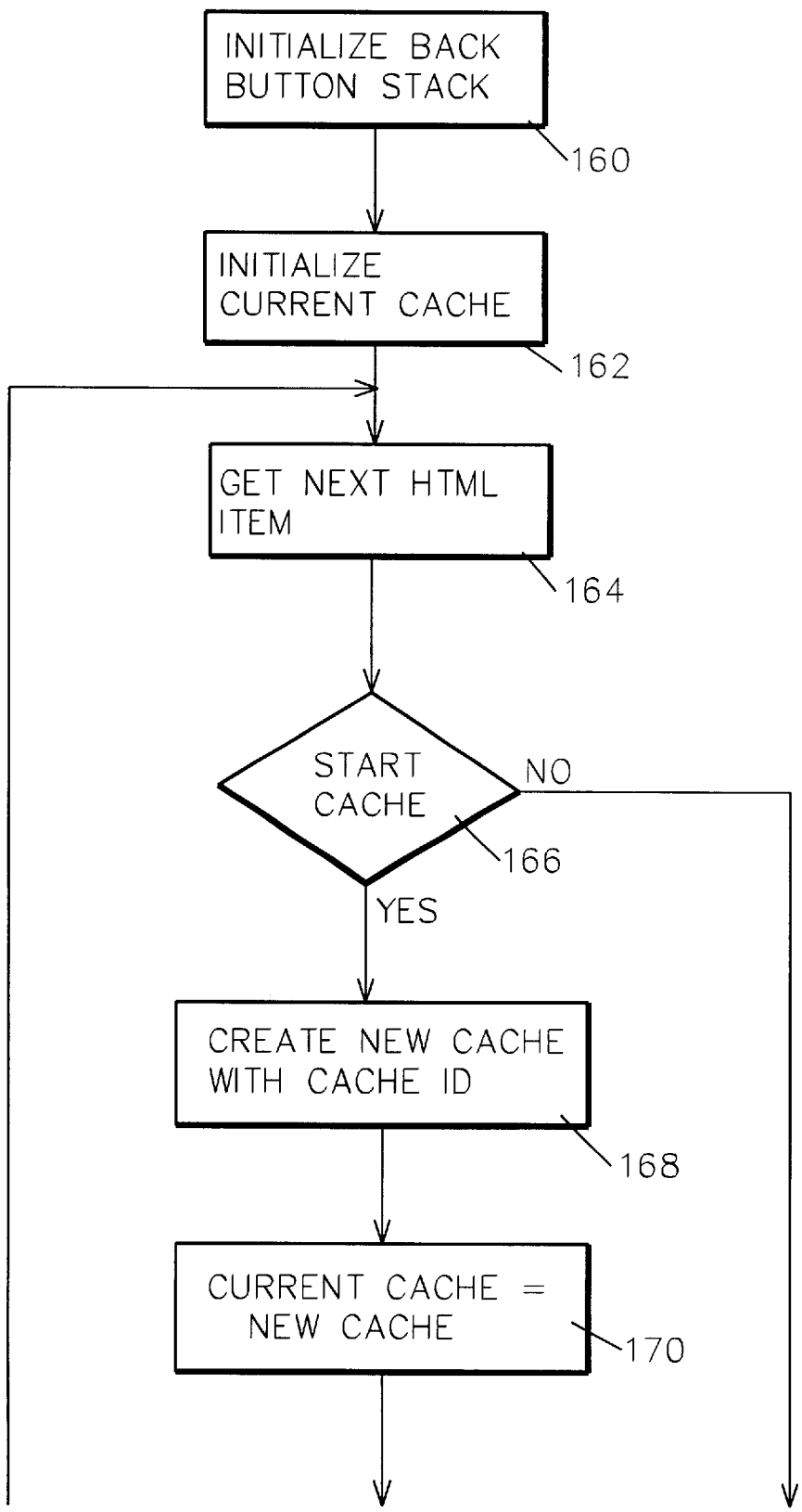
FIGS. 5A through 5D, oriented as shown if
Figure 5B:
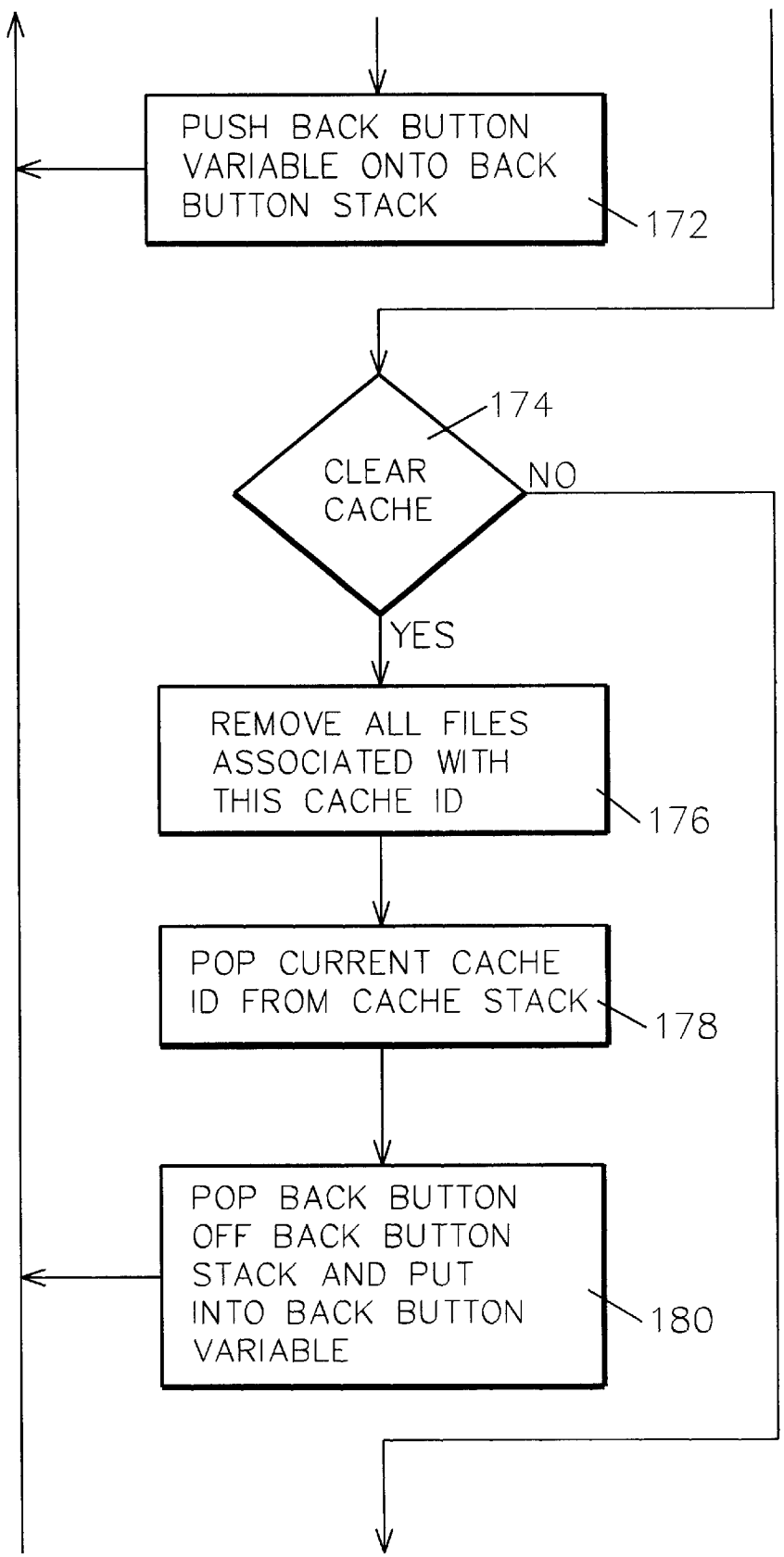
Figure 5C:
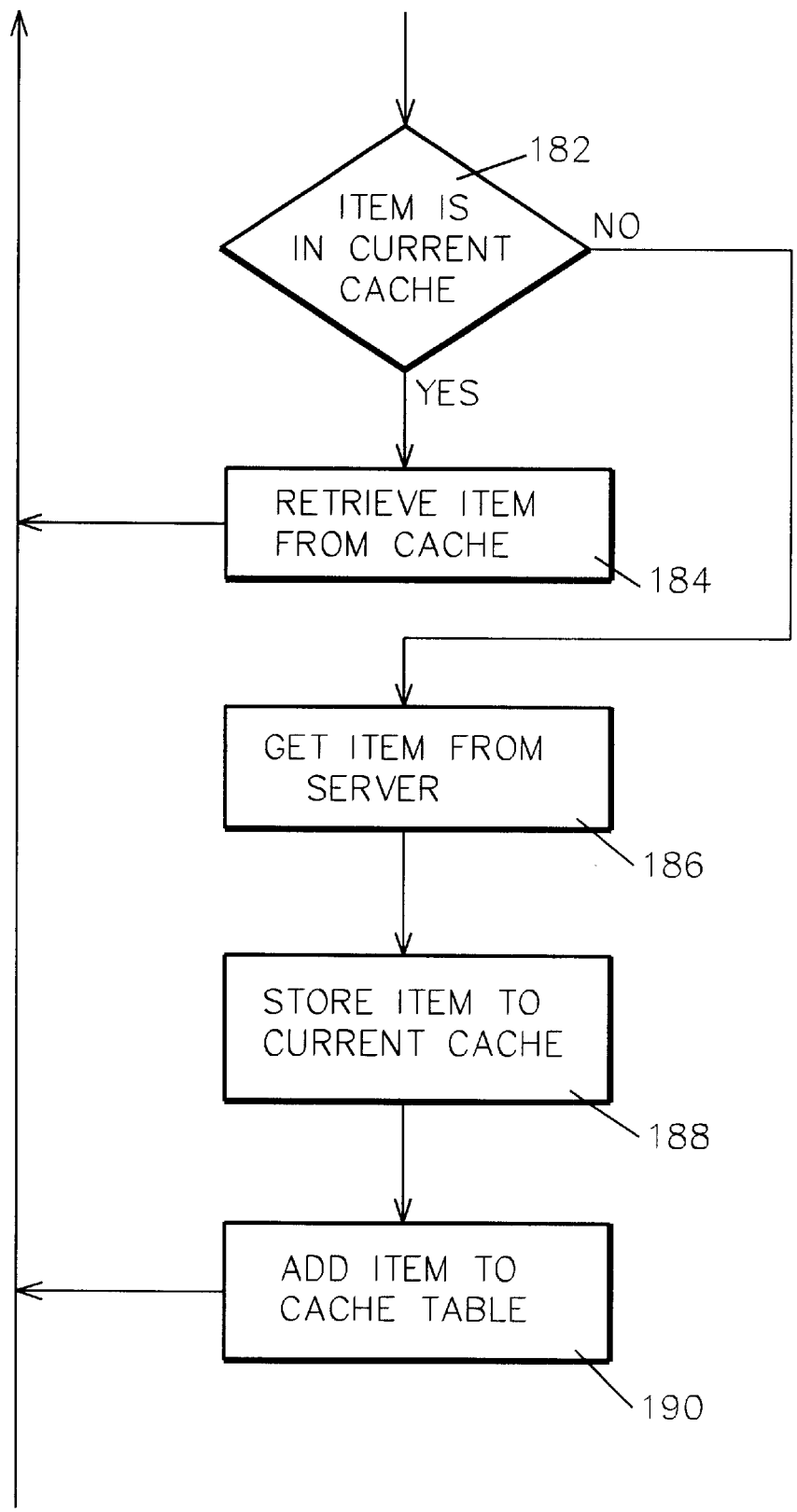
Figure 5D:
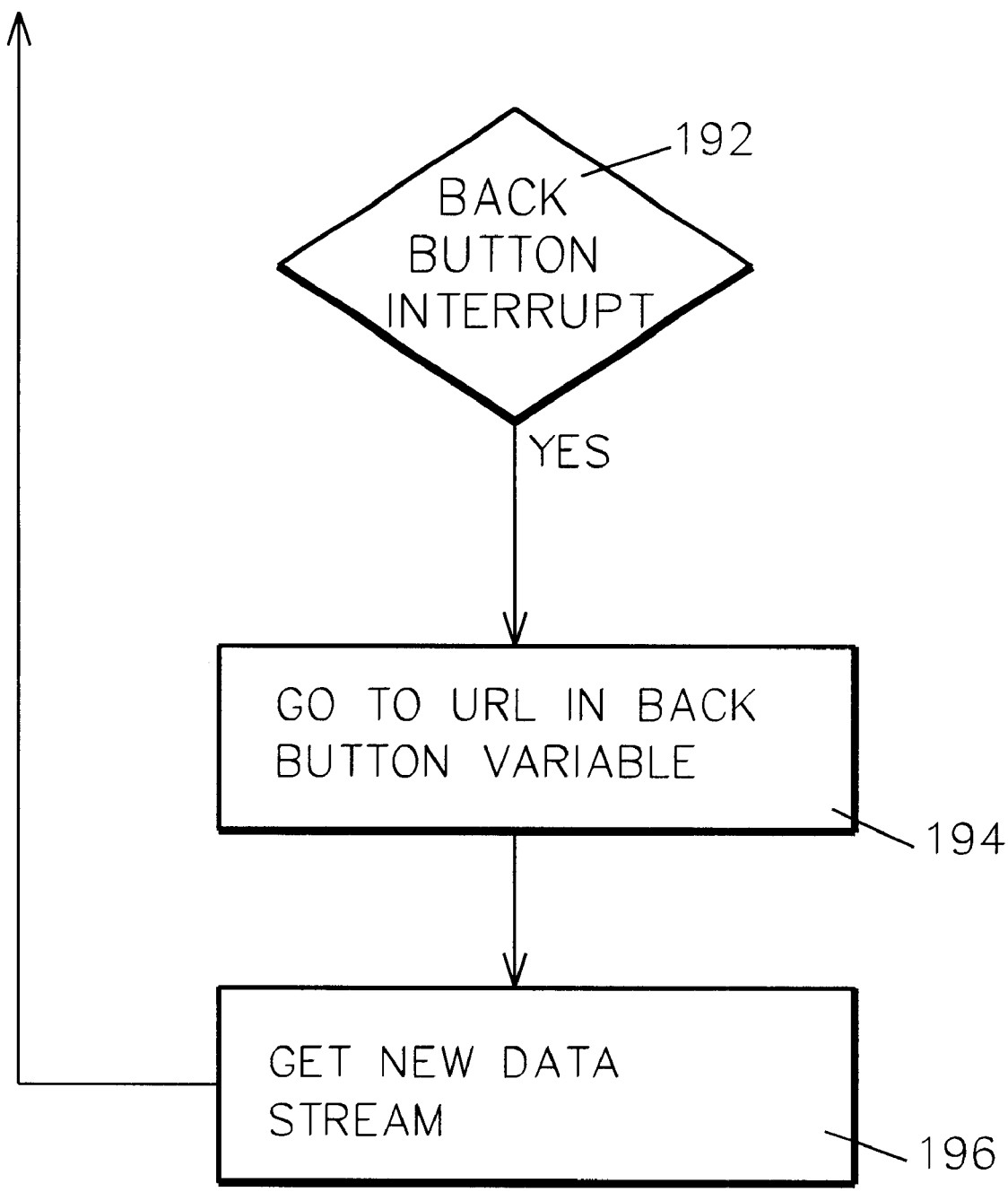

Referring to FIGS. 3 and 4, each html and image file 152 received by browser 102 from server 100 is saved in a cache directory, which is a subdirectory of the browser directory.

Referring to FIG. 3, in accordance with a first embodiment of the invention, the local file system is used by browser 104 to differentiate between <start cache> tags. Cache lookup table 106 includes one or more row entries, each row entry including server 150 and local name 154. Local name .cache\vision\0078.gif. 154 provides a pointer .browser\cache\vision\0078.gif. to the location in storage 108 containing image data 152.

When browser 104 receives in data stream 120 a file containing a <start cache> tag 134, it will create a new subdirectory .cache\vision. into which all subsequent files, including herein .0078.gif. will be saved until it receives a <clear cache> tag 146, at which time it will remove that subdirectory .cache\vision. and, optionally write over the subdirectory data 152 for security. In this case, .cache. is a subdirectory within the directory .browser., and .vision. is a subdirectory within .cache..

Referring to FIG. 4, in accordance with a second embodiment of the invention, browser 104 uses a new field 156 in cache table 106 to differentiate between <start cache> tags. In this embodiment, cache lookup table 106 includes one or more row entries, each row entry including server cache name 156, server name 150, and local name 158. Browser 104 takes server name ./dir1/picture.gif. 150, creates local name .cache\0078.gif. 158, and cache name .vision. 156 to form this row entry. Local name 158 provides pointer .browser\cache\0078.gif. into the storage 108 are containing image data 152. In this case, .browser. is the directory, and .cache. a subdirectory within .browser..

Images received from server 100 by browser 104 are tagged by server file name. In this case, this tag 138 comprises .<img src=./dir1/picture.gif.>, which represents the location ./dir1/. on server 100 of the image file .picture.gif.. Browser 104, upon parsing a subsequent page, checks cache table 106 to see if a previously received file has that name ./dir1/picture.gif., and if so, uses its own copy 152 from the cache directory 108. If not, browser 104 requests the image with that file name ./dir1/picture.gif. to be downloaded from server 100.

Table 1 is a pseudo code representation of the method of invention for server 100 to manage cache storage 108 client 102.

TABLE 1

CACHE MANAGEMENT

```
INITIALIZE BACK BUTTON STACK      /* POINTER TO PREVIOUS URL
INITIALIZE CURRENT CACHE          /* CREATE CACHE STACK
GET NEXT HTML ITEM                /* FROM SERVER STREAM,
                                  /* INCLUDES ITEM TAG
IF THERE IS A START CACHE         /* IN THIS HTML PAGE
THEN
    CREATE NEW CACHE WITH CACHE IDENTIFIER
        /* IF ALT 1: CREATE NEW DIRECTORY IN FILE SYSTEM:
        /* browser\cache\vision
        CURRENT CACHE = NEW CACHE    /* PUSH NEW CACHE ID ONTO
                                     /* CACHE STACK
        PUSH CURRENT BACK BUTTON VARIABLE ONTO BACK BUTTON STACK
ELSE IF THERE IS A CLEAR CACHE TAG
THEN
    REMOVE ALL FILES ASSOCIATED WITH THIS CACHE IDENTIFIER
    POP CURRENT CACHE IDENTIFIER FROM CACHE STACK
    POP BACK BUTTON OFF OF BACK BUTTON STACK
        AND PUT INTO BACK BUTTON VARIABLE
ELSE                                 /* REGULAR BROWSER FUNCTION
    IF ITEM IS IN CURRENT CACHE      /* ITEM IS ANY SERVER IMAGE
                                     /* OR TEXT
    THEN
        RETRIEVE ITEM FROM CACHE /* ITEM IS IN CACHE
    ELSE
        GET ITEM FROM SERVER
        STORE ITEM TO CURRENT CACHE ON HARD DISK
        ADD ITEM TO CACHE TABLE
            /* IF ALT 1: LOCAL CACHE NAME STARTS WITH:
            /*    browser\cache\vision
```

TABLE 1-continued

CACHE MANAGEMENT

```
        /* IF ALT 2: CACHE NAME IS "vision" IN CACHE TABLE
CONTINUE;                       /* LOOP TO NEXT ITEM
IF BACK BUTTON PRESSED          /* INTERRUPT BUTTON
                                /* CLICKED
    GO TO URL IN BACK BUTTON VARIABLE
    GET NEW DATA STREAM
    LOOP TO NEXT ITEM
END;
```

Referring to FIGS. 5A through 5D, the method of invention provides for server 100 control of browser cache 108. During steps 160 and 162, back button stack 116, which is a pointer to a previous URL, and a current cache variable, which is the entry at the top of cache stack 118, are initialized and, possibly, used and modified during execution prior to the current loop, which begins at step 164 for a next html item.

In step 164, a next html item is parsed from input stream 120, and in step 166 it is determined if the current html item includes a <start cache> tag. In the example of FIG. 2, <html> item 132 for welcome page 124 includes a <start cache vision> tag and identifier 134. In this case, the yes branch on test 166 results, in step 168, in the creation of a new cache with cache identifier and, in step 170, the current cache variable is set equal to the new cache by pushing the new cache identifier onto cache stack 118. In step 172, the back button variable is pushed onto the back button stack 116, and execution returns to step 164 to get the next html item.

If, in step 166, it is determined that the current html page does not include a <start cache> tag, then in step 174 it is determined if a <clear cache> tag is present. If, as is the case in the example of FIG. 2, a <clear cache> tag 146 with identifier <vision> is present, in step 176 all files 152 associated with this cache identifier are removed; in step 178 the current cache identifier is popped from cache stack 118; and in step 180 a back button is popped from back button stack 116 and put into the back button variable and execution returns to step 164 to get the next html item.

If, in step 174, it is determined that the current html page does not include a <clear cache> tag, then in step 182 it is determined if the current html item is in current cache. If so, in step 184 that item is retrieved from cache, executed, and processing returns to step 164 to get the next html item in data stream 120. If not, in step 186 browser 104 requests the item from server 100 and, upon receiving it, in step 188 stores the item to current cache 108, in step 190 adds that item to cache table 106 (in a manner described previously with respect to alternative embodiments 1 and 2), executes it and returns to step 164 to get the next html item from data stream 120.

In step 192, if a back button interrupt is received, in step 194 browser 104 goes to the URL pointed to by the back button variable and, in step 196, gets a new data stream 120.

Advantages over the Prior Art

It is an advantage of the invention that a more reliable system and method for clearing a browser cache is provided.

It is a further advantage of the invention that there is provided a system and method for clearing a browser cache which does not rely on user action.

It is a further advantage of the invention that there is provided a system and method for clearing a browser cache under control of the server.

It is a further advantage of the invention that there is provided an improved client browser responsive to a server tag to clear its cache Alternative Embodiments It will be appreciated that, although specific embodiments of the invention have been described herein for purposes of illustration, various modifications may be made without departing from the spirit and scope of the invention. In particular, it is within the scope of the invention to provide a memory device, such as a transmission medium, magnetic or optical tape or disc, or the like, for storing signals for controlling the operation of a computer according to the method of the invention and/or to structure its components in accordance with the system of the invention.

Accordingly, the scope of protection of this invention is limited only by the following claims and their equivalents.

We claim:

1. Method for controlling the contents of a browser cache, comprising the steps of:
    receiving in a data stream from a host server a clear cache tag; and
    responsive to said clear cache tag, clearing said browser cache.

2. The method of claim 1, further comprising the steps of:
    receiving in said data stream from said host server a start cache tag;
    receiving from said data stream one or more data files;
    adding at least one of said data files to said client browser cache; and
    responsive to said clear cache tag, said clearing step further clears said client browser cache of data files received in said data stream between said start cache tag and said clear cache tag.

3. The method of claim 2 wherein said data files include textual data files and non-textual data files.

4. The method of claim 2 wherein a local file system is used to differentiate between successive start cache tags.

5. The method of claim 2 wherein a field in a cache table is used to differentiate between successive start cache tags.

6. The method of claim 2 wherein each of said start cache tag and said clear cache tag include a cache identifier, and wherein said client browser cache is cleared responsive to said clear cache tag of all data files associated with said cache identifier.

7. The method of claim 2 further comprising the steps of:
    maintaining a back pointer stack comprising pointers to successive web pages;
    responsive to a back pointer interrupt received subsequent to said clear cache tag, executing the web page received immediately prior to said start cache tag.

8. Method for operating a host server to control client browser cache contents, comprising the steps of:

inserting into a data stream a start cache tag; and thereafter inserting into said data stream a clear cache tag;

wherein said host server causes a client browser to clear said browser cache of data cached from said data stream between said start cache tag and said clear cache tag.

9. A program storage device readable by a machine, tangibly embodying a program of instructions executable by a machine to perform method steps for clearing a client browser cache responsive to a server command, said method steps comprising:

receiving in a data stream from a host server a clear cache tag; and responsive to said clear cache tag, clearing said client browser cache.

10. The program storage device of claim 9, wherein said method steps further comprise:

receiving in said data stream from said host server a start cache tag;

receiving from said data stream one or more data files;

adding at least one of said data files to said client browser cache; and responsive to said clear cache tag, clearing said browser cache of data files received in said data stream between said start cache tag and said clear cache tag.

11. An article of manufacture comprising:

a computer usable medium having computer readable program code means embodied therein for operating a client browser to clear its cache responsive to a server command, the computer readable program means in said article of manufacture comprising:

computer readable program code means for causing said client browser to effect receiving in a data stream from a host server a clear cache tag; and computer readable program code means for causing said client browser to effect responsive to said clear cache tag, clearing said browser cache.

12. A client terminal system, comprising:

a communications port for receiving from a host server a data stream including a plurality of web pages, a first web page including a start cache tag and a second web page including a clear cache tag;

a client cache storage for caching data files received in said data stream; and a browser responsive to said clear cache tag for clearing said client cache storage of data files received in said data stream between said start cache tag and said clear cache tag.

13. A host server system, comprising:

a host processor;

a communications port responsive to said host processor for transmitting to a client browser a data stream, said data stream including a start cache tag followed by at least one data file followed by a clear cache tag;

wherein said host processor controls a cache at said client browser to delete data files from said cache transmitted between said start cache tag and said clear cache tag.

* * * * *